Feb. 5, 1924.
J. CATSULES
1,482,736
FRUIT AND VEGETABLE KNIFE
Filed Oct. 27, 1923
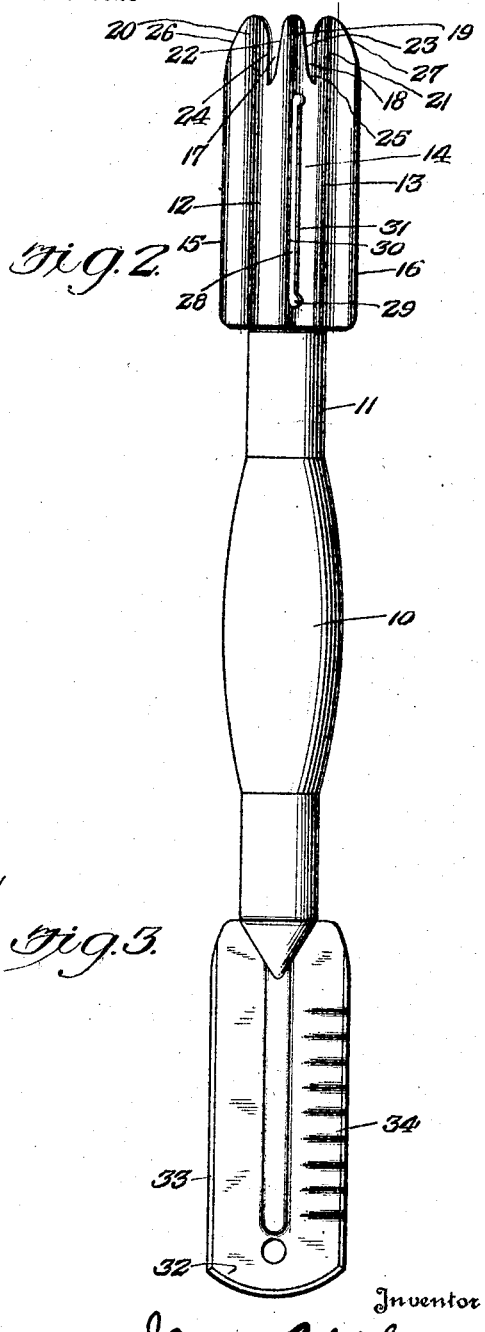
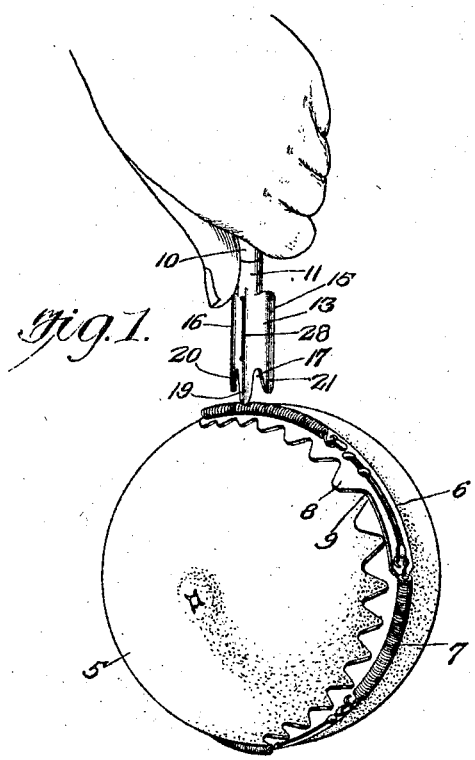
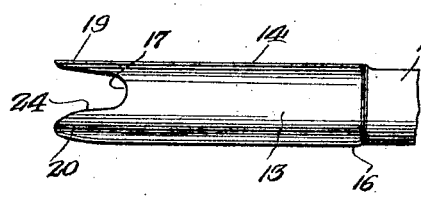
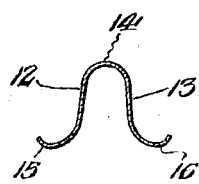
Inventor
James Catsules
By James R. Bowen
Attorney Patented Feb. 5, 1924.

1,482,736

UNITED STATES PATENT OFFICE.

JAMES CATSULES, OF WEST HOBOKEN, NEW JERSEY.

FRUIT AND VEGETABLE KNIFE.

Application filed October 27, 1923. Serial No. 671,162.

*To all whom it may concern:*

Be it known that JAMES CATSULES, a subject to the King of Greece, residing at West Hoboken, in the county of Hudson and State of New Jersey, has invented certain new and useful Improvements in Fruit and Vegetable Knives, of which the following is a specification.

The present invention relates to improvements in fruit and vegetable knives and consists in certain improvements over the knife shown and described in my prior application Serial No. 632,910, filed April 18, 1923, entitled Kitchen utensils.

It is an object of the invention to provide an improved knife particularly for the purpose of dividing oranges, grape fruit and other fruits and vegetables, in which the division is made by passing the knife radially into the center of the fruit successive times all about the center or equator line of the fruit or vegetable as a result of which the two half portions of the divided fruit or vegetable present a scalloped severed surface. This form of the fruit or vegetable is much used to-day.

Other objects of the invention are to provide an improved knife constructed for easy penetration, that is produced simply and inexpensively, is capable of withstanding the longitudinal strains developed in this work and which will impart to the fruit or vegetable an improved appearance in which the scallops are rounded at the corners instead of made sharp as heretofore.

With the foregoing and other objects in view, the invention will be more fully described hereinafter, and will be more particularly pointed out in the claims appended hereto.

In the drawings, wherein like symbols refer to like or corresponding parts throughout the several views, Figure 1 shows a perspective view of a piece of fruit and the improved knife applied thereto, together with a guiding ring described more particularly in the prior application aforesaid.

Figure 2 is an enlarged plan view of the knife.

Figure 3 is a fragmentary side view thereof, and

Figure 4 is an end view.

Referring more particularly to the drawings 5 designates a piece of fruit, such as an orange or grape fruit and 6 designates an expansible ring made up in sections which are drawn together or contracted normally by the coil springs 7 and which are provided with alternate projections 8 and troughs 9 forming a scalloped guiding surface for the improved knife.

This guiding ring is more specifically described in my pending application above identified. The improved knife is constituted by a handle 10 of wood or other appropriate material shaped desirably to fit the hand of the operator which for convenience and ease in the operation assumes the position shown in Figure 1. The scalloping knife is carried by one end of the handle 10 and is made of sheet metal shaped and bent to form the cylindrical or other shank 11 clamped about the handle 10 and secured thereto in any appropriate manner.

The knife itself consists of the side wings 12 and 13 having the rounded connecting web 14 and the side wings having the flanges 15 and 16. All of these various parts are shaped from the same piece of metal and grooves 17 and 18 are made at the front or outer end portion of the knife between the web and the side wings in order to produce the prongs 19, 20 and 21. The grooves enter for a considerable distance and the side walls of the prong 19 are inclined or bevelled as indicated at 22 and 23 while the nose or outer extremity of the central prong is rounded, the inclination of the sides 22 and 23 taking place from the relatively narrow nose or tip backwardly in divergent relation to the innermost portions of the grooves where the prong merges with the body of the knife. In a similar way the edges 24 and 25 of the side prongs 20 and 21 are curved or bevelled rearwardly so that the side prongs are of narrower section or width at their tip portions than they are at their rear portions so that maximum cutting effect is secured with the greatest possible strength.

The outer edges of the side prongs as shown at 26 and 27 are likewise curved to the tips of the prongs and the tips and side walls of the prongs are sharpened. The prongs being relatively narrow points are easily centered upon the fruit and the initial penetration is made simply and without effort leaving the hand free for the light touch required for great accuracy. As the knife is pushed down however the bevel or curved side edges of the prongs have a shearing effect on the fruit and they ease the knife into the fruit or vegetable and the web and the side wings follow in the openings cut by the prongs, the knife being driven substantially into the center of the fruit or vegetable as indicated in Figure 1.

The knife is superior to the V-shaped knife shown in my prior application in that the knife is more easily centered and more easily inserted in the fruit or vegetable. The knife is also stronger by reason of the rounded condition of the web and the side wings and by reason of the strength, and reinforcement secured for the outer edges of the side wings by the flanges 15 and 16.

Moreover these flanges 15 and 16 initiate the cutting for the next scallop and these cuttings form guides for inserting the knife subsequently so that the ring 6 may or may not be used with a knife. On occasions the ring is apt to slip when used and these cuttings of the fruit by the flanges 15 and 16 will assist to bring the ring back to a proper position. The projections and troughs of the ring 6 differ from that referred to in the prior application only in that the top portions of the projections 8 are rounded in order to receive the inner rounder surface of the web 14 of the knife and the troughs 9 instead of being made in the shape of sharp angles are also rounded to take the flanges 15 and 16. If desired the web at one side may be provided with a peeling slot 28 having the circular opening 29 at the ends thereof and the cutting blade 30 formed at one edge of the slot. It is noted that the circular openings 29 extend inwardly of the edge 31 opposite the blade 30 in order to permit of forcing the edge 31 slightly inward forming a guide or gage for the fruit or vegetable when scraping the knife over the surface.

This blade is suitable for peeling fruits and vegetables and is very desirable for use in conjunction with the scalloping knife and the web forms a very convenient portion especially when rounded to receive this peeling knife.

The handle 10 may carry at the other end a further knife blade 32 having a sharpened edge 33 at one side for general culinary purposes and a scalloped edge 34 at the other side for slicing bananas or the like in which the slices are given a scalloped appearance.

It is obvious that various changes and modifications may be made in the details of construction and design of the above specifically described embodiment of this invention without departing from the spirit thereof.

What is claimed is:—

1. A fruit and vegetable knife comprising a web, side wings and outturned flanges, said web, wings and flanges having projecting prongs with sloping sharpened surfaces.

2. A fruit and vegetable knife comprising side wings, a rounded connecting web, a flange turned outwardly and upwardly from the free edges of the side wings and adapted to initiate the next cuttings of the knife in the fruit or vegetable, said web and side wings having prongs with grooves between the prongs, said prongs having sloping side walls diverging rearwardly.

3. A fruit and vegetable knife comprising a handle, a shank carried by said handle, a web secured to the shank and being of a rounded form, side wings extending downwardly in slight divergent relation from the rounded web portion and having out-turned and up-turned flanges at the free edges of the side wings for initiating the subsequent cuttings of the knife, said wings having grooves in the outer ends thereof, prongs formed upon the wings and web and spaced by the grooves, said prongs having edges diverging rearwardly and being sharpened.

4. A vegetable and fruit knife comprising a handle, a shank affixed thereto, a rounded web carried by the shank and having a slot and a peeling blade formed therein, side wings diverging slightly from said web and having out-turned and up-turned flanges, and spaced prongs with sharpened inclined side edges carried by said wings and the web.

In testimony whereof I affix my signature.

JAMES CATSULES.